(12) United States Patent
Lundberg et al.

(10) Patent No.: US 10,390,552 B2
(45) Date of Patent: Aug. 27, 2019

(54) HIGHLY REFINED CELLULOSE-BASED GEL

(71) Applicants: Brock M. Lundberg, Osseo, WI (US); Alexander Scott Jasper, Eau Claire, WI (US)

(72) Inventors: Brock M. Lundberg, Osseo, WI (US); Alexander Scott Jasper, Eau Claire, WI (US)

( * ) Notice: Subject to any disclaimer, the term of this patent is extended or adjusted under 35 U.S.C. 154(b) by 1125 days.

(21) Appl. No.: 14/331,178

(22) Filed: Jul. 14, 2014

(65) Prior Publication Data
US 2015/0024108 A1    Jan. 22, 2015

Related U.S. Application Data

(60) Provisional application No. 61/846,007, filed on Jul. 13, 2013.

(51) Int. Cl.
*A23L 29/262* (2016.01)
*A23L 29/20* (2016.01)

(52) U.S. Cl.
CPC .......... *A23L 29/262* (2016.08); *A23L 29/20* (2016.08)

(58) Field of Classification Search
CPC ........ A23V 2002/00; A23V 2250/5108; C08L 1/02; C08L 1/04; C08L 1/00; C08L 1/06; C08L 1/08; A23L 1/0534; A23L 29/262; A23L 29/20
USPC ................................................. 426/573, 577
See application file for complete search history.

(56) References Cited

U.S. PATENT DOCUMENTS

| | | | |
|---|---|---|---|
| 2,334,281 A * | 11/1943 | Olsen | A23L 29/231 426/577 |
| 2,480,710 A | 8/1949 | Bryant | |
| 3,892,871 A * | 7/1975 | Cooper | A23L 29/20 426/573 |
| 5,008,254 A * | 4/1991 | Weibel | A21D 2/183 424/439 |
| 5,567,462 A | 10/1996 | Ehrlich | |
| 6,506,435 B1 | 1/2003 | Lundberg et al. | |
| 7,074,300 B2 | 7/2006 | Lundberg et al. | |
| 7,094,317 B2 | 8/2006 | Lundberg et al. | |
| 7,582,213 B2 | 9/2009 | Lundberg et al. | |
| 7,833,558 B2 | 11/2010 | Larsen et al. | |
| 8,399,040 B2 | 3/2013 | Lundberg et al. | |
| 2003/0116289 A1 | 6/2003 | Lundberg et al. | |
| 2004/0086626 A1 | 5/2004 | Lundberg et al. | |
| 2005/0074542 A1 | 4/2005 | Lundberg et al. | |
| 2005/0271790 A1 | 12/2005 | Aronson et al. | |
| 2005/0274469 A1 | 12/2005 | Lundberg et al. | |
| 2006/0204631 A1 | 9/2006 | Lundberg et al. | |
| 2006/0251789 A1 | 11/2006 | Lundberg et al. | |
| 2008/0166464 A1 | 7/2008 | Lundberg et al. | |
| 2008/0193590 A1 | 8/2008 | Lundberg | |
| 2009/0274811 A1 | 5/2009 | Lundberg et al. | |
| 2009/0269376 A1 | 6/2009 | Lundberg et al. | |
| 2011/0268860 A1 | 11/2011 | Lundberg et al. | |
| 2012/0142909 A1 | 6/2012 | Lundberg | |

FOREIGN PATENT DOCUMENTS

EP    0295875 A2 * 12/1988    ......... H04N 1/40056

* cited by examiner

*Primary Examiner* — Jyoti Chawla
(74) *Attorney, Agent, or Firm* — Mark A. Litman & Associates, P.A.

(57) ABSTRACT

A method forms a gel from a highly-refined cellulose by: providing a composition of highly refined cellulose fiber as at least about 0.5% weight/weight highly refined cellulose to water; adding at least one buffering agent to the composition to maintain the pH of the composition at a pH below 9.5; bringing the buffered composition to an elevated temperature such as a boil; stirring the buffered composition; and cooling the buffered composition to below 25° C. to form a gel, such as a stable gel.

20 Claims, No Drawings

HIGHLY REFINED CELLULOSE-BASED GEL

RELATED APPLICATION DATA

This Application claims priority from U.S. Provisional Application Ser. No. 61/846,007 filed 13 Jul. 2013.

BACKGROUND OF THE INVENTION

1. Field of the Invention

The present invention relates to the field of the use of refined agricultural materials, particularly cellulosic fibers and more particularly highly refined cellulosic fibers especially those fibers having relatively high concentrations (greater than 5% total weight) parenchyma cell wall source. A particularly desirable use of these highly refined cellulose fibers is in the manufacture of gels, and particularly gels that can be used as thickening agents. The present invention also relates to the field of preparing highly refined cellulose fiber products from pectin-containing plant materials, including a method for providing fiber-containing pectin products from parenchyma cell wall materials.

2. Background of the Art

In the industrial production of food and beverages, many byproducts are produced that are fibrous in nature and contain cellulose, hemicelluloses and pectin. By-products or waste products examples include: sugar beet slices from the production of sugar from sugar beets, citrus peels and citrus pulp from the manufacture of juice and ethereal oils from citrus fruits, pomace residues from cider production, and potato fibers from potato processing. These plant by-products are often considered as waste products to be disposed of in the most appropriate and most inexpensive way. However, it will be understood that there may be quite obvious advantages by further developing such plant by-products into products of more commercial value.

Parenchymal cell walls refer to the soft or succulent tissue, which is the most abundant cell wall type in edible plants. For instance, in sugar beets, the parenchyma cells are the most abundant tissue the surrounds the secondary vascular tissues (xylem and phloem). Parenchymal cell walls contain relatively thin cell walls compared to secondary cell walls are tied together by pectin (Haard and Chism, 1996, Food Chemistry, Ed. by Fennema, Marcel Dekker N.Y., N.Y.) In secondary cell walls (xylem and phloem tissues), the cell walls are much thicker than parenchymal cells and are linked together with lignin This terminology is well understood in the art.

A common feature of these by-products is that they consist essentially of soluble and insoluble plant fibers, of which about 50-90% are dietary fibers, including three biopolymers: cellulose, hemicellulose and pectin involved in the structure of all plant cell walls, which can be conceived as a cellulose-hemicellulose-pectin network in which pectin, apart from being a structural element, also constitutes the "cement" imparting rigidity to the plant cells. This complex structure in which pectin is attached to the other cell wall components by covalent bonds, hydrogen bonds, and/or ionic interaction is often termed protopectin. Purified pectin, per se, can be obtained by controlled, acidic or basic hydrolytic extraction of protopectin. Purified pectin is a linear polymer composed of units of a-D-galacturonic acid attached by a-1,4-glycoside bonds to form long chains of polygalacturonic acid. The galacturonic acid units are esterified with methanol to a varying degree. A distinction is thus made between high-ester pectin having a degree of esterification (DE) of greater than 50% and low-ester pectin having a degree of esterification of less than 50%. The degree of esterification is defined as the number of methyl-esterified galacturonic acid units expressed as a percentage of the total galacturonic acid units in the pectin molecule and may thus be a value between 0% and 100%. In pectin from some types of plant material, e.g. potatoes and sugar beets, a varying part of the galacturonic acid units may, in addition, be acetylated, expressed as the degree of acetylation (DAc), which is defined, analogous to the degree of esterification, as the number of acetylated galacturonic acid units as a percentage of all galacturonic acid units. Neutral sugars, such as galactose, glucose, rhamnose, arabinose and xylose, may also be part of the pectin polymer as side-chains to or as members in the polygalacturonic acid chain. Hemicellulose is a heterogeneous group of polysaccharides containing several kinds of hexose and pentose sugars and, in some cases, residues of uronic acid. These polymers are classified according to the type of sugar residues being dominant and are individually referred to as xylans, arabinogalactans, glucomannans and so on.

Present endeavors to find utility for these fiber residues include methods of refining the fiber mass and compositions and treatments of the refined (highly refined cellulose are described in the following U.S. Published Applications and Patents: 20120142909 (Viscosity Control in Compositions Comprising Plant Fiber Materials); 20110268860 (Novel Dairy Product Compositions Using Highly Refined Cellulosic Fiber Ingredients), now U.S. Pat. No. 8,399,040; 20090274811 (Defect Separation from Dry Pulp); 20090269376 (Stabilization Of Cosmetic Compositions); 20080193590 (Highly Refined Cellulose Neutraceutical Compositions and Methods of Use); 20080166464 (Moisturizing Composition for Protein Materials); 20060251789 (Novel Dairy Product Compositions Using Highly Refined Cellulosic Fiber Ingredients); 20060210687 (Enhanced Crackers, Chips, Wafers and Unleavened Using Highly Refined Cellulose Fiber Ingredients); 20060204631 (Cellulose Fiber-Based Compositions and Their Method of Manufacture) now U.S. Pat. No. 7,074,300; 20050274469 (Highly Refined Fiber Mass, Process of Their Manufacture and Products Containing the Fibers) now U.S. Pat. No. 7,094,317; 20050271790 (Reduced Fat Shortening, Roll-in and Spreads Using Citrus Fiber Ingredients); 20050074542 (Highly Refined Cellulosic Materials Combined with Hydrocolloids); 20040086626 (Highly Refined Fiber Mass, Process of Their Manufacture and Products Containing the Fibers); 20030116289 (Cellulose Fiber-Based Compositions and Their Method of Manufacture) now U.S. Pat. Nos. 6,506,435; and 7,582,213 (Cellulose Fiber-Based Filters). These applications and are incorporated in their entirety, especially with respect to the disclosed technology in manufacturing highly refined cellulose, and citrus pulp-based highly refined cellulose and their physical and chemical properties.

U.S. Pat. No. 5,567,462 discloses a method of preparing pecto-cellulosic compositions and pectin from pectin-containing plant raw materials, such as citrus peels, sugar beet pulp, sunflower residues, and pomace residues. The method consists of treating the comminuted plant raw materials with an acid, e.g., phosphoric or nitric acid, or with a base, e.g., sodium hydroxide or sodium carbonate, to give a mixture consisting of a solid phase containing cellulose components and a liquid phase containing dissolved pectin. The mixture is mashed, neutralized and finally dried to form pecto-cellulosic dry matter. The mashed mixture may also be separated into a solid and a liquid phase, which are neutralized individually and dried to give a pectin product and a pecto-cellulosic product.

It is also known in the prior art how to de-esterify pectin or a pectin-containing material with aqueous ammonia in an organic solvent, e.g. isopropanol, in which pectin is non-soluble. This technique is for example disclosed in U.S. Pat. No. 2,480,710.

U.S. Pat. No. 7,833,558 (Larsen et al., also referred to herein as the "KMC Patent") asserts a method whereby, without dissolving pectin and without using organic solvents, it is possible to carry out the de-esterification of pectin in an entirely aqueous system in the treatment of a pectin-containing plant material, which has been swollen in an aqueous solution containing neutral salts prior to the de-esterification treatment. The method includes providing a pectin product, said method comprising the steps of: (i) providing an in situ reaction system by swelling the plant material in an aqueous solution, wherein said aqueous solution comprises at least one salt; (ii) subjecting pectin present in the swollen plant material from step (i) to a de-esterification treatment in the presence of an alkaline reagent; and (iii) separating the de-esterified fiber-containing pectin product, wherein the alkaline reagent provided in step (ii) results in a pH above 10. The method may include further steps of (iv) adding an extraction medium to the fiber-containing pectin product providing an extraction suspension; (v) adjusting the pH of the extraction suspension to a pH in the range of 1-12; (vi) adjusting the temperature of the extraction suspension to a temperature in the range of 0-120° C.; and (vii) isolating the pectin product from the aqueous phase of the extracting medium. This method produces significant alkaline waste and is reagent intense in the mounts of alkaline materials, in part because of the high pH levels used to de-esterify the pectin.

The present invention may provide a simple method of treating highly refined cellulose fibers, especially citrus pulp-based highly refined cellulose fibers, including highly refined pectin-containing plants under normally very weak de-esterifying conditions, thereby achieving fiber-containing pectin products as well as isolated pectin products of high commercial value and high practical use.

SUMMARY OF THE INVENTION

A method forms a gel from a highly refined cellulose by: providing a composition of highly refined cellulose fiber as at least about 0.5% weight/weight highly refined cellulose to water; adding at least one buffering agent to the composition to maintain the pH of the composition at a pH below 9.5 (including acidic levels of pH); bringing the buffered composition to an elevated temperature such as a boil; stirring the buffered composition; and cooling the buffered composition to below 25° C. to form a gel, such as a stable gel.

A method provides a fiber-containing (and possibly pectin-containing) product from a highly refined cellulose plant fiber material. Such a method might include: (i) providing an in situ or continuous reaction system by swelling the highly refined cellulose fiber plant material in an aqueous solution, where said aqueous solution comprising a solution buffered to a pH between 4.0 and 8.0 (e.g., by at least one salt, and preferably at least two salts), (ii) subjecting the highly refined cellulose fiber plant material (including any pectin present) as the swollen plant material from step (i) to warm water preferably 50° C. or above followed by allowing the mixture to cool. Although the preferred range has been identified as between 4.0 and 9.0, or 4.0 and 8.0, the buffering can be outside of that range as shown by the presence of a buffered pH of 2.8 and even up to 9.5.

A further aspect of the present invention provides a product from the highly refined cellulose reagent that has at least one property selected from the group consisting of: (i) the product has a viscosity of at least 5 cps when mixed in a concentration of (a maximum of) 3% (w/w) of the total dry weight of the highly refined cellulose fiber product (and if pectin is present as at most 1% w/w pectin) in a solution with water.

DETAILED DISCLOSURE OF THE INVENTION

One aspect of the present invention is to provide a method for treating processed HRC products to obtain gels. The difference in this invention compared to prior art is that the present invention requires no special treatment during the processing of HRC to produce a gel. Rather, regular HRC processing techniques can be used but the novelty of the present invention revolves in how the HRC product is applied in an application to obtain a gel. Namely, when HRC is combined with water and salt(s), a gel can be obtained. The HRC should comprise at least 0.1% by dry weight of the combination product, and other ingredients (as later described) may be in the mixture of HRC and hydrocolloid. The HRC base material in this patent can be citrus, apple, potato, or beet based, or they may be comprised mostly any expanded cellulosic material. U.S. Pat. No. 6,506,435 provides one non-limiting example of at least one such cellulosic material.

Examples of salts or buffering agents that can be used include: calcium alginate, calcium sulfate, calcium carbonate, calcium hydroxide, calcium chloride, calcium phosphate, calcium citrate, calcium tartrate, sodium carbonate, sodium citrate, sodium chloride, sodium hydroxide, sodium tartrate, sodium phosphate, sodium sulfate, potassium chloride, potassium alginate, potassium L-tartrate, potassium citrate, potassium carbonate, potassium sulfate, tris HCL buffer, citric acid, acetate buffer, ammonium phosphate, alginic acid, diphosphates (many), triphosphates (many), polyphosphates (many), stearyl citrate, chitosan. Nitrates, such as sodium nitrate, potassium nitrate and calcium nitrate, may also be used.

Calcium chloride is common laboratory and industrial chemical. It is used as a desiccant, a coagulant in products like tofu and in the natural state, unrefined calcium sulfate is a translucent, crystalline white rock. The dihydrate ($CaSO_4.2H_2O$) occurs naturally as gypsum. The anhydrous form occurs naturally as β-anhydrite. The crystal size of calcium sulfate will vary depending on the how calcium is obtained and reacted. Phosphates are a commonly used food additives that are used for many different purposes. They can be used for texturing, binding, emulsifying, leavening, and changing surface tension. One of the common forms of phosphate is disodium phosphate, which is a collection of sodium salts and phosphoric acids used to enhance flavors in processed meats and cheeses, soups, canned goods, gravy mixes, preserved fruits, bake goods and other processed foods. Disodium phosphate is also used as an emulsifier and it helps to improve cooked yields in many meat products.

The following is a description of some preferred HRC materials used in the practice of the invention that are combined with the salts and water to form gels. A highly refined cellulosic material (HRC as previously defined e.g., cellulose, modified celluloses, derivatized celluloses (e.g., cellulose materials that have been chemically modified or have had groups modified with ionic components), hemicellulose, lignin, etc.) product can be prepared by generally moderate treatment and still provide properties that are equivalent to or improved upon the properties of the best highly refined cellulose products produced from more intense and environmentally unfriendly processes. Fruit or vegetable cells with an exclusively parenchymal cell wall structure can be treated with a generally mild process to form highly absorbent microfibers. Cells from citrus fruit and sugar beets are particularly available in large volumes to allow volume processing to generate highly refined cellulose fibers with both unique and improved properties. These exclusively parenchymal microfibers (hereinafter referred to as EPM's) have improved moisture retention and thickening properties that enable the fibers to provide unique benefits when combined into edible products (e.g., baked goods, liquefied foods, whipped foods, meats, meat fillers, dairy products, yogurt, frozen food entrees, ice cream, etc.) and in mixtures that can be used to generate edible food products (e.g., baking ingredients, dehydrated or low hydration products).

A high parenchymal refined cellulose fiber additive product comprising a high parenchymal content fiber reagent that has organic fiber plant mass comprising at least 30% by weight of all fiber mass as parenchymal fiber mass. A citrus fiber product of the process may have substantially less than 50% of the fiber. The process for making HRC cellulose from parenchyma cell wall products, e.g. citrus fruit and sugar beets by-products, can be performed in the absence of a hydroxide soaking step, although an optional soaking step may be used as is known to be performed with more typical (corn husk) agricultural based highly refined cellulose products as described in U.S. Pat. No. 6,506,435. The use of processing without NaOH soaking is a significant advance over the prior art. Dinand, et al. (U.S. Pat. No. 5,964,983) also recommends the use of a chemical treatment step in addition to bleaching. In a preferred embodiment of the present invention we are able to attain higher functionality (measured as viscosity) compared to Dinand et al. even though we use less chemical treatment, which is likely due to the higher amount of shear and chemical energy we put into the materials. The product is able to display the same or improved water retention properties and physical properties of the more strenuously refined agricultural products of the prior art, and in some cases can provide even higher water retention values, thickening and other properties that can produce unique benefits in particular fields of use.

General descriptions of the HRC material invention include a highly refined cellulose product comprising microfibers derived from organic fiber plant mass comprising at least 50% by weight of all fiber mass as parenchymal fiber mass, the highly refined cellulose product having an alkaline water retention capacity of at least about 25 g $H_2O$/g dry highly refined cellulose product and methods for providing and using these products. The highly refined cellulose product may have a water retention capacity of at least 50 g $H_2O$/g dry highly refined cellulose product.

Parenchymal cell walls refer to the soft or succulent tissue, which is the most abundant cell wall type in edible plants. For instance, in sugar beets, the parenchyma cells are the most abundant tissue the surrounds the secondary vascular tissues (xylem and phloem). Parenchymal cell walls contain relatively thin cell walls compared to secondary cell walls are tied together by pectin (Haard and Chism, 1996, Food Chemistry, Edited by Fennema. Marcel Dekker NY, N.Y.). In secondary cell walls (xylem and phloem tissues), the cell walls are much thicker than parenchymal cells and are linked together with lignin (Smook). This terminology is well understood in the art.

As used in the practice of the present invention, the term "dry" or "dry product" refers to a mass that contains less than 15% by weight of fibers as water. The organic fiber mass comprises at least 50% by weight of fiber mass from organic products selected from the group consisting of sugar beets, citrus fruit, grapes, tomatoes, chicory, potatoes, pineapple, apple, carrots and cranberries. A food product or food additive may have at least 0.05 percent by weight solids in the food product or food additive of the above described highly refined cellulose product. The food product may also have at least about one percent or at least about two percent by weight of the highly refined cellulosic fiber of the invention.

A method for refining cellulosic material may have steps of: soaking raw material from organic fiber plant mass comprising at least 50% by weight of all fiber mass as parenchymal fiber mass in an aqueous solution with less than 1% total weight of the solution/mixture NaOH or less than 1% by total weight of the solution/mixture of an acid (e.g., free acid as opposed to a buffering agent that by relative strength of its anion(s) and cation(s) creates a stable pH environment); draining the raw material and allowing the raw material to sit for a sufficient period under conditions (including ambient conditions of room temperature and pressure as well as accelerated conditions) so that the fibers and cells are softened so that shearing can open up the fibers to at least 40%, at least 50%, at least 60%, or at least 70, 80, 90 or 95% of their theoretic potential. This will usually require more than 4 hours soaking to attain this range of their theoretic potential. It is preferred that this soaking is for more than 5 hours, and preferably for at least about 6 hours. This soaking time is critical to get the materials to fully soften. When such a low alkaline concentration is used in the soaking, without the set time, the materials do not completely soften and cannot be sheared or opened up to their full potential. This process produces soaked raw materials; and the process continues with refining the soaked raw material to produce refined material; and drying the soaked raw material.

The process may include drying by many different commercial methods, although some display improved performance in the practice of the present invention. It is preferred that drying is performed, at least in part, by fluid bed drying or flash drying or a combination of the two. An alternative drying process or another associated drying step is performed at least in part by tray drying. For example, fluid bed drying may be performed by adding a first stream of organic fiber plant mass and a second stream of organic fiber plant mass into the drier, the first stream having a moisture content that is at least 10% less than the moisture content of the second stream or organic fiber plant mass. The use of greater differences in moisture content (e.g., at least 15%, at least 20%, at least 25%, at least 40%, at least 50% weight-to-weight water percent or weight-to-weight water-to-solid percent) is also within the scope of practice of the invention. In the drying method, the water may be extracted with an organic solvent prior to drying. In the two stream drying process, the second stream of organic fiber plant mass may have at least 25% water to solids content and the first stream may have less than 15% water to solids content. These processes may be practiced as batch or continuous processes. The method may use chopping and washing of the cellulose mass prior to soaking.

Another description of a useful process according to the invention may include draining and washing the soaked raw material in wash water to produce washed material; bleaching (or not) the washed material in hydrogen peroxide to produce a bleached material; and washing and filtering the bleached material to produce a filtered material. The drying of an expanded fiber (coprocessed with hydrocolloid as described herein) material according to the invention may use room temperature or higher air temperatures that dry the expanded fiber product and maintain the fiber material's functionalities of at least two characteristics of surface area, hydrogen bonding, water holding capacity and viscosity. It is also useful to use back-mixing or evaporating to bring the organic fiber plant mass to a solids/water ratio that will fluidize in air in a fluid bed air dryer. This can be particularly performed with a method that uses a fluid bed dryer or flash dryer to dry the expanded or highly refined cellulosic fiber product.

The HRC dispersion of the present invention is a highly viscous, semi-translucent gel. HRC embodiments comprise dried powders that are redispersable in water to form gel-like solutions. The addition of salts and warm water to the final HRC product allow the formation of a gel.

The Plant Materials

The present invention relates to the field of the use of refined agricultural materials, particularly cellulosic fibers and more particularly highly refined cellulosic fibers especially those from parenchyma cell wall source. In the context of the present invention the terms "plant material", "pectin-containing plant material" and "pectin-containing plant starting material" are used interchangeably and relates to any kind of plant material comprising pectin which may/can be used for preparing fiber-containing pectin products or pectin products.

Suitable materials may also include pectin-containing materials obtained from native vegetable materials in a fresh or dried state, containing pectin with a degree of esterification greater than 30%, preferably greater than 40%, more preferably greater than 50%, and typically from 60% to 70%.

Swelling

The aqueous solution, in which the HRC-starting material is swelled, may contain at least one added water-soluble and neutral salt selected from the groups consisting of sodium salts, potassium salts and calcium salts, and mixtures thereof. Particularly preferred are chlorides, such as sodium chloride, potassium chloride and calcium chloride, and mixtures thereof. However, also nitrates, such as sodium nitrate, potassium nitrate and calcium nitrate, may be used. Other salts applicable in the present invention may be found in EP 0 664 300 which is hereby incorporated by reference.

The amount of salt added to the solution, in which the HRC starting material is suspended and swelled, may be selected so that it corresponds to a salt concentration of from 1 mmol to 30 mmol per gram of dry matter of HRC-containing plant material, preferably from 5 mmol to 15 mmol per gram of dry matter of HRC-containing plant material.

In a preferred embodiment of the present invention swelling of the plant material provides a suspension in which the content of HRC dry matter is ranging from 0.1%-50% by weight, such as from 0.1%-20% by weight, e.g. from 0.1%-15% by weight, such as from 0.1%-10% by weight, e.g. from 0.1%-5% by weight, typically from 0.2-4%, such as 3.5% by weight.

The suspension of the HRC-containing plant starting material in the aqueous, saline solution occurs, while stirring, at a temperature ranging from about 0 C to about 120 C, preferably ranging from 40 C to 110 C, e.g. from 4-100° C., such as form 50-100° C., e.g., from 60-100° C., such as about 100° C.

The time suitable for providing sufficient swelling of the HRC material is selected to obtain a structure which is sufficiently permeable and allowing passage of liquids and dissolved substances. In a preferred embodiment according to the present invention time the plant material is allowed to swell in the aqueous solution, depending on the type and state of the HRC-containing plant material, from 1 to 120 minutes to obtain sufficient swelling and salt saturation of the pectin-containing plant material. In another embodiment the time selected is from 1-100 minutes, such as from 1-80 minutes, e.g. from 1-70 minutes, such as from 10-70 minutes, e.g. from 10-60 minutes, such as from 15-40 minutes, e.g. from 20-30 minutes, The time required for obtaining sufficient swelling and salt saturation depends, inter alia, on the physical dimensions of the pectin-containing plant starting material, which may be in the form of particles having an average particle size ranging from 1 mm or less and to parts with a maximum dimension of about 5 mm.

The Products

The HRC-containing products obtainable by the method of the present invention consist essentially of soluble and insoluble fibers comprising cellulose, hemicellulose, and lignin apart from pectin. The so-called dietary fibers, i.e., cellulose, hemicellulose, pectin, and lignin, amount to about 50-80% by weight.

In the treatment according to the invention of the HRC-containing plant starting material the pectin polymer has been loosened, but not dissolved, from the cellulose-hemicellulose network.

Contrary to the HRC-containing plant starting material, the obtained fiber-containing HRC product when combined with salts, warm water, followed by cooling has increased gelling, thickening and viscosifying properties. With calcium or other salts and ions in aqueous solutions, the fiber-containing pectin product obtainable by the method of the invention can form stable gels with surprisingly high gel strengths or viscous solutions with high viscosities.

The gelling and viscous giving properties of the HRC-containing products render the products obtainable by the method of the present invention highly useful in the manufacture of fiber-containing and low-fat foods, such as the use of the pectin products as a general fiber product in various contexts, as a gelling and water-binding ingredient in industrially processed foods, feeds and pet foods, and a diarrhea inhibiting agent or health improving agent to animals and humans.

Thus, the present invention relates to different types of products namely a HRC-containing product obtainable by the above disclosed method, a HRC product obtainable by the above method and a product as such comprising HRC all having the same special characteristics, such as viscosity and gel strength.

In an embodiment of the present invention a HRC-containing pectin product is provided, said native galacturonic acid in the HRC having a degree of esterification of at least 50%, preferably at least 60%, 70% or at least 80% based on available sites that can be converted to esters (e.g., —OH and —COOH groups).

In the present context the term "product comprising pectin" relates compositions, solutions or other kind of mixtures where the galacturonic polymer constitute from 1-100% of the product by weight, such as from 1-50%, e.g. 1-25%, such as 1-10%, e.g. 10-100%, such as 25-75%, e.g. 50-75%.

In an embodiment of the present invention the pectin present, in either the fiber-containing pectin product, the isolated galacturonic product and/or the product comprising galacturonic acid, has a degree of esterification from 10-90, such as from 10-80, e.g. from 20-80, such as from 30-80, e.g., from 40-80, such as from 50-80-50, e.g. from 60-80.

One preferred method for determining viscosity uses the following procedure:
1. Hydrate the HRC using 15 g HRC and 485 g of water to make a 3% solution in a Waring blender (Model S1BL30 (7010)) placed on low speed for 180 seconds.
2. Measure the viscosity using a Brookfield (LV) DV II+ viscometer using cylindrical spindles (typically S61, S62, or S63) at 10 rpm at room temperature (25+3 C).
3. Measure viscosities both at 0.5 hr and/or 24 hrs.

In yet an embodiment of the present invention the product has a viscosity of at least 5 cps (centipoise) when mixed in a concentration of at the most 1% (w/w) of pectin in a solution, such as at least 10 cps, at least 20 cps, e.g. at least 25 cps, such as at least 40 cps, at least 50 cps, at least 75 cps, at least 100 cps, or at least 200 cps.

The highly refined cellulose fiber-containing products of this invention and the products obtainable by treatments as disclosed hereinabove has technical properties allowing technical applications with various fields. The gel strength, viscosifying and emulsifying properties of the product make it suitable for, e.g., encapsulation of materials such as solutions, emulsions, suspensions of actives or colorants. Properties of the product and its natural plant fiber derivation source allows its properties to be used in the production of foods and feeds, within the pharmaceutical and cosmetic industries (e.g., by encapsulating micronutrients, flavoring agents, vitamins, etc.). The products of the present invention are thus useful in the production of solid and liquid pharmaceutical compositions, including, e.g., tablets, suspensions, emulsions, etc. and as components in cosmetic products, such as perfumes, creams, and lotions, etc.

Under certain production conditions, the product of the invention generates a protective film around the agent(s) desirably to be protected from, e.g., oxygen, light, heat, etc. Alternatively, the agent desirably to be protected may be embedded in an encapsulation gel based of the present product. The product may be applicable as a structuring agent by direct addition and/or by restructuring of components in foods and feeds. In feeds, e.g., by the restructuring of residual meat as chunks, as a viscosifying agent in gravies, gel-forming agents together with meat and bone meal, and as a structuring component in dry feed products under low-pressure extrusions. Furthermore, the addition of the product will increase the autoclave stability of the feed products and the vigorous emulsifying effect may prevent fat leakage during autoclave treatment.

In foods, the products of the invention may advantageously be used as a natural fat replacement component in so-called "light" products. A particularly advantageous aspect of such an application is that an emulsifying effect of the products enables the omission of conventional emulsifiers.

Furthermore, the pectin-containing products of the invention may be used as skin-friendly components in diapers, tissues, sanitary napkins, etc.

The fiber-based products are useful for making jams, spreads, butters (e.g., apple butter, almond butter) and jellies, for bakery products including jams and dough, acidified protein beverages, wound care preparations, ostomy products, etc.

EXAMPLES

Percent De-Esterification (DE), and any other properties identified (except viscosity) were determined in accordance with the methods described in Food Chemical Codex, Fourth Edition, National Academic Press, Washington 1996, page 283.

Determination of Gel Strength

The gel strength (expressed in grams) was obtained at about 20° C. using a Brookfield "Texture Analyzer" (Stable Micro Systems, model TA-XT2i) using the following parameters: Press cylinder piston (SMS P/O 5R): 5 mm diameter Distance: 4 mm Rate: 0.5 mm/sec.

The gels of the prior art method of U.S. Pat. No. 7,833,558 (Larsen et al.) were made in the following manner:

An amount (3-4 g) of fiber-containing pectin product corresponding to 1.2 g of pectin, or 1.2 g of purified pectin product, was slurried in 110.5 g of demineralised water containing 0.100 g of sodium hexametaphosphate. By adding concentrated aqueous ammonia (25%) dropwise with vigorous stirring by an Ultra Turrax stirrer (UT), the pH was adjusted to 4.5. The mixture was heated to 70-80° C. in a microwave oven and UT-treated once more, whereupon 60 g of saccharose was added and dissolved in the warm mixture under UT-stirring.

Calcium hydrogen phosphate ($CaHPO_4.2H_2O$) was weighed in the tip of a weighing boat and transferred quantitatively with 2.times.5 ml of demineralised water to the hot polymer mixture under UT-stirring. 2.2 g of gluconodeltalactone ($C_6H_{10}O_6$) was dissolved in 12.5 ml of cold demineralised water and similarly transferred quantitatively with 2.5 ml of demineralised water to the hot polymer mixture containing the finely divided slightly soluble calcium hydrogen phosphate. Following UT-stirring of the hot mixture, the mixture now having a weight of 200 g was deposited in flat tape wrapped dishes (diameter: 60 mm; height: 15 mm). Upon cooling at room temperature (about 20° C.) until the next day, a gel had been formed. The tape was removed and excess gel was cut off with cheese cutting blade.

Examples of the Present Invention

Procedure:
1. Add appropriate amount of highly refined cellulose fiber (HRC, such as the Citri-Fi® fiber line of dry highly refined cellulose fiber to an empty beaker or glass jar.
2. Add specified amount of salts (usually as a buffer, maintaining the pH of the reaction solution at or below 9.5, preferably below 9.0 and generally between about (4.0-8.0) to the jar.
3. Add sugar to jar as well if specified.
4. Bring tap water to a boil on stove (at least 90° C.), and add appropriate amount of water to dry mix to make 3% solution of fiber in water.
5. Mix vigorously preferably, with stick blender or blending/mixing apparatus until smooth.

6. Place mixture in refrigerator (below 15° C.) to cool to below room temperature.

EXP 1: 2 g $CaSO_4$, 2.5 g $HNa_2PO_4$, 15 g Citri-Fi® 100FG, 485 mL $H_2O$.

Results: firm gel that improved with time, e.g. 2 hours, in refrigerator. It had a reaction almost identical to the homemade process for making Jell-O® deserts.

EXP 2: 2 g $CaSO_4$, 2.5 g $HNa_2PO_4$, 15 g Citri-Fi® 100FG, 4 g sugar, 485 mL $H_2O$.

Results: firm gel that improved its rigidity with time in refrigerator. No observable difference from above experiment EXP 3: 2 g $CaSO_4$, 2.5 g $HNa_2PO_4$, 7.5 g Citri-Fi® 100FG, 250 mL $H_2O$.

Results: firm gel that improved with time in refrigerator.

EXP 4: 2 g $CaSO_4$, 2.5 g $HNa_2PO_4$, 3 g Citri-Fi® 100FG, 100 mL water.

Results: solution thickened slightly upon cooling but did not gel significantly. It would appear that too much salt prevented the formation of a gel-network.

EXP 5: 0.5 g $CaSO_4$, 0.5 g $HNa_2PO_4$, 15 g Citri-Fi® 100FG, 485 mL water.

Results: solution formed firm gel much like first two experiments (with only 0.1% salts by weight present).

EXP 6: 0.25 g CaSO4, 0.25 g $HNa_2PO_4$, 0.25 g K-L-Tartrate, 7.5 g Citri-Fi® 100FG, 242 mL water.

Results: solution thickened upon cooling without forming solid gel network.

EXP 7: 1 g CaSO4, 1 g $HNa_2PO_4$, 0.25 g Xanthan Gum, 7.5 g Citri-Fi® 100FG, 242 mL water.

Results: solution formed cohesive gel, gum appears to provide soft texture

EXP 8: 1 g CaSO4, 1 g $HNa_2PO_4$, 0.25 g Guar Gum, 7.5 g Citri-Fi® 100FG, 242 mL water.

Results: solution formed firm gel, gum appears to provide soft texture

EXP 9: 1 g CaSO4, 1 g $HNa_2PO_4$, 0.25 g Xanthan Gum, 0.25 g Guar Gum, 7.5 g Citri-Fi® 100FG, 242 mL water.

Results: solution formed firm gel, and the gum appears to provide soft texture

EXP 10: 1 g CaSO4, 1 g $HNa_2PO_4$, 0.25 g alginic acid, 7.5 g Citri-Fi® 100FG, 242 mL water.

Results: solution formed firm gel, alginic acid appears to provide flexibility. (Note that this is less than 1.0% by weight of acid)

It is theorized that gelling in the practice of the present technology is enabled due to two things: 1) a HRC product that has an amorphous structure with high surface area such that it can swell in water and not be inhibited by crystalline regions in the fiber that would prevent the structure from gelling and 2) it's the cross linking formed by the galacturonic acid (the main biopolymer contained in pectin) that actually is involved in forming the gel network. CF products contain approximately 23.3% galacturonic acid.

It is known in scientific literature that de-esterification to produce lower DM pectin/galacturonic acid promotes increased gelling ability and this is what is done with de-esterification and gelling in high alkaline conditions. The basis of the KMC patent is that they add a salt to the fiber structure before adding alkaline to do purification and deesterification. This is a lot different compared to what we are doing. In the present technology, we don't need to de-esterify the pectin/galacturonic acid because we are producing HRC that is amorphous and readily swells in water so it is conducive to gelling even when the galacturonic acid isn't deesterified. We don't need to de-esterify nor purify like the KMC patent because of the HRC process and this is more efficient, requires fewer chemicals, less yield loss, and is less costly.

As for more detail on the mechasism within the pectin and galacturonic acid, In high-ester pectins (such as the type in Citri-Fi™ fibers) at soluble solids content above 60% and a pH-value between 2.8 and 3.6, hydrogen bonds and hydrophobic interactions bind the individual pectin chains together. These bonds form as water is bound by sugar and forces pectin strands to stick together. These form a 3-dimensional molecular net that creates the macromolecular gel. The gelling-mechanism is called a low-water-activity gel or sugar-acid-pectin gel.

In low-ester pectins (such as those disclosed in the above-identified KMC Patent), ionic bridges are formed between calcium ions and the ionized carboxyl groups of the galacturonic acid. This is idealized in the so-called "egg box-model". Low-ester pectins need calcium to form a gel, but can do so at lower soluble solids and higher pH-values than high-ester pectins. Normally low-ester pectins form gels with a range of pH from 2.6 to 7.0 and with a soluble solids content between 10 and 70%. Amidated pectins behave like low-ester pectins but need less calcium and are more tolerant of excess calcium. Also, gels from amidated pectin are thermo-reversible; they can be heated and after cooling solidify again, whereas conventional pectin-gels will afterwards remain liquid. High-ester pectins set at higher temperatures than low-ester pectins. However, gelling reactions with calcium increase as the degree of esterification falls. Similarly, lower pH-values or higher soluble solids (normally sugars) increase gelling speed. Suitable pectins can therefore be selected for jams and for jellies, or for higher sugar confectionery jellies.

Also, in high-ester pectins the junction zones are formed by the cross-linking of HG [galacturonic acid] by hydrogen bridges and hydrophobic forces between methoxyl groups, both promoted by high sugar concentration and low pH. In low-ester pectins junction zones are formed by calcium cross-linking between free carboxyl groups.

The gel or thickening material can be added to any liquid material (or liquid to be frozen or chilled to a gel itself, such as soft serve ice cream, ice cream, gelato, milk shakes, and the like) and especially to liquids that are intended to be edible and fit for human consumption. It can be mechanically blended or manually blended or stirred into the liquids before consumption. The mechanical mixing may be by stirrer or air injection mixing. One skilled in the art will appreciate the various option and alternatives available for commercial or private practice.

What is claimed:

1. A method of forming a gel comprising from a highly refined cellulose comprising:
   providing a composition of highly refined cellulose fiber as at least 0.5% weight/weight highly refined cellulose to water;
   adding at least one buffering agent to the composition to maintain the pH of the composition at a pH below 9.5;
   bringing the buffered composition to a boil;
   stirring the buffered composition before cooling the buffered composition to form a gel; and
   cooling the buffered composition to below 25° C. to form a gel.

2. The method of claim 1 wherein the at least one buffering agent maintains the pH of the composition between 4.0 and 8.0.

3. The method of claim 2 wherein the buffering agent comprises less than 1% by molecular percent of ammonium and less than 1% molecular percent of hydroxide and wherein the highly refined cellulose fiber is present as at least 0.5% weight/weight highly refined cellulose to water with no more than 1% pectin weight/weight highly refined cellulose.

4. The method of claim 1 wherein the gel is combined with a liquid to thicken the liquid and wherein the highly refined cellulose fiber is present as at least 0.5% weight/weight highly refined cellulose to water with no more than 1% pectin weight/weight highly refined cellulose.

5. A solid mass formed by the method of claim 1.

6. The method of claim 1 wherein the at least one buffering agent maintains the pH of the composition between 4.0 and 9.0.

7. The method of claim 6 wherein the buffering agent comprises less than 1% by molecular percent of ammonium and less than 1% molecular percent of hydroxide.

8. The method of claim 7 wherein the gel is combined with a liquid to thicken the liquid.

9. The liquid mass formed by the method of claim 8.

10. The method of claim 6 wherein the gel is combined with a liquid to thicken the liquid.

11. The liquid mass formed by the method of claim 10.

12. The method of claim 1 wherein ester groups present in pectin from the highly refined cellulose are esterified during boiling, stirring and cooling to a degree of esterification of less than 50%.

13. The method of claim 12 wherein the gel is combined with a liquid to thicken the liquid.

14. A solid mass formed by the method of claim 12.

15. The method of claim 12 wherein the gel is added to an edible liquid composition to form a combination and the combination is chilled to increase viscosity of the combination and wherein highly refined cellulose.

16. The increased viscosity combination formed by the method of claim 15.

17. The method of claim 1 wherein the gel is added to an edible liquid composition to form a combination and the combination is chilled to increase viscosity of the combination.

18. The increased viscosity combination formed by the method of claim 17.

19. A method of forming a gel comprising from a highly refined cellulose comprising:
 providing a composition of highly refined cellulose fiber as at least 0.5% weight/weight highly refined cellulose to water with no more than 1% pectin weight/eight highly refined cellulose;
 adding at least one buffering agent to the composition to maintain the pH of the composition at a pH below 9.5;
 bringing the buffered composition to a boil;
 stirring the buffered composition; and
 cooling the buffered composition to below 25° C. to form a gel.

20. The method of claim 19 wherein stirring the buffered composition is performed before cooling the buffered composition to below 25° C. to form a gel.

* * * * *